United States Patent [19]
Fraser, Jr.

[11] Patent Number: 5,261,317
[45] Date of Patent: Nov. 16, 1993

[54] BELLOWS WITH DIRT COLLECTING RECESSES

[75] Inventor: Howard H. Fraser, Jr., Lafayette, N.Y.

[73] Assignee: Carrier Corporation, Syracuse, N.Y.

[21] Appl. No.: 993,557

[22] Filed: Dec. 21, 1992

[51] Int. Cl.⁵ .............................................. F01B 19/00
[52] U.S. Cl. ............................................ 92/42; 92/34; 92/45; 92/47
[58] Field of Search .................... 92/34, 35, 42, 45, 47, 92/103 M

[56] References Cited

U.S. PATENT DOCUMENTS

| | | | |
|---|---|---|---|
| 3,224,344 | 12/1965 | Baumann et al. | 92/45 |
| 4,457,213 | 7/1984 | Morgan | 92/42 |

FOREIGN PATENT DOCUMENTS

| | | | |
|---|---|---|---|
| 0012152 | of 1911 | United Kingdom | 92/45 |
| 1377087 | 12/1974 | United Kingdom | 92/34 |

*Primary Examiner*—Thomas E. Denion

[57] ABSTRACT

A welded bellows is formed by welding together a stack of annular elements such that spacer rings are located between adjacent elements at the inner and outer diameters and are the locations for the welds. The spacer rings eliminate very small clearances/contact between movable members which can be the locations for stress risers in the presence of dirt.

3 Claims, 2 Drawing Sheets

BELLOWS WITH DIRT COLLECTING RECESSES

BACKGROUND OF THE INVENTION

Bellows of the welded type are, typically, made up of a plurality of annular members. The members are often in the form of Belleville washers or springs so that they are essentially frustoconical. Individual members are welded on one side at their inner diameter for attachment to a first adjacent member and are welded on the other side at their outer diameter for attachment to a second adjacent member. The result is a stack of alternately converging and diverging members. The edges or "weld flat" portions of the individual elements are in extremely close contact which becomes closer and more widespread during compression of the bellows. As a result, any small particle (e.g. a few microns) of dirt that becomes trapped during the manufacturing processing can become the site of localized high stress resulting in fatigue failure.

SUMMARY OF THE INVENTION

A spacer ring is located between the annular bellows members on both the inner and the outer diameter. In a preferred embodiment the spacer ring is recessed. As a result, movement that took place between adjacent members is now divided between the two members and the intermediate spacer ring. The recesses provide a non-interfering location for any dirt present and pockets are formed for receiving dirt such that sensitivity to dirt can be greatly reduced.

It is an object of this invention to provide a more reliable bellows.

It is an additional object of this invention to reduce sensitivity of bellows to dirt. These objects, and others as will become apparent hereinafter, are accomplished by the present invention.

Basically, rigid spacer rings are located between flexing annular diaphragm members at the inner and outer diameters whereby sensitivity to dirt is reduced. Additionally, the spacer rings are recessed thereby forming relatively large cavities which can receive collected dirt.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
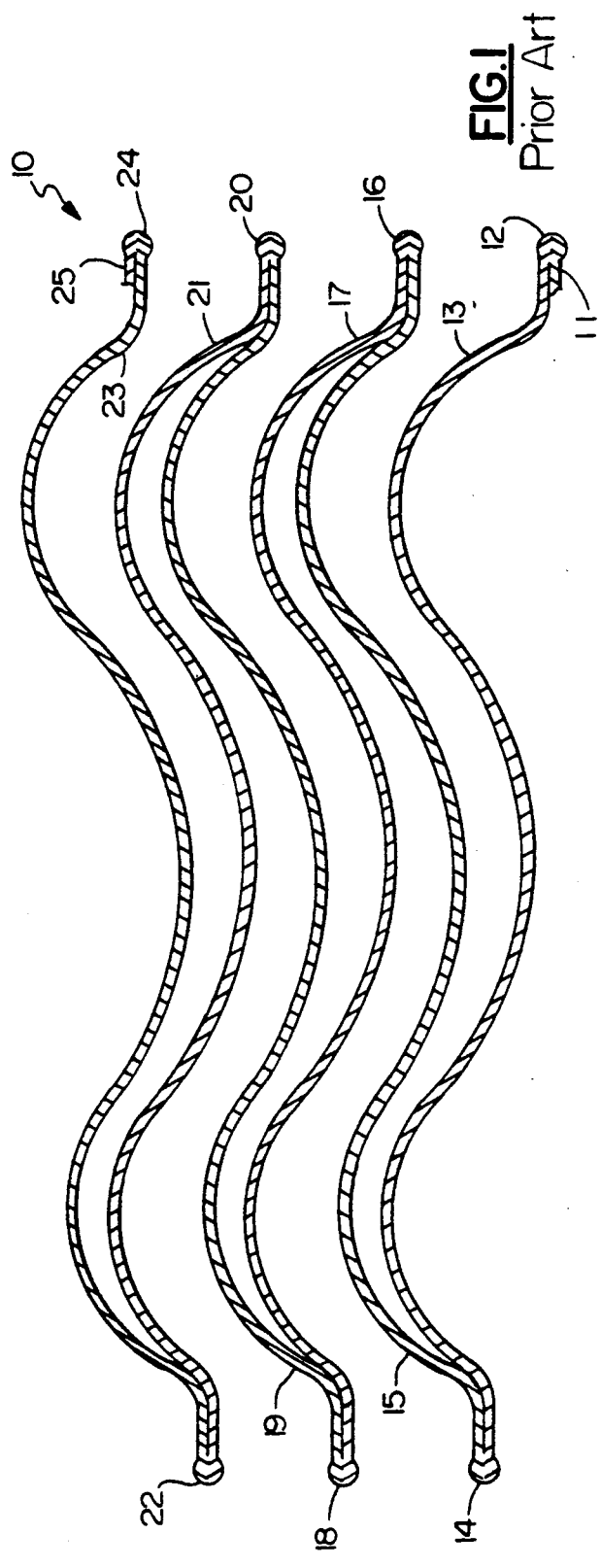
FIG. 1 is an enlarged cross sectional view of a portion of the PRIOR ART bellows of the welded type.

In FIG. 1, the numeral 10 generally designates a PRIOR ART welded type bellows. In the construction of such a bellows a series of essentially annular, radially wavy, frustoconical members, called diaphragms, are welded together with full penetration welds in a stack of alternating diverging and converging members. Pairs of diaphragms are called convolutions. Starting with inner circumferential weld 12 which is located at the interior of the bellows 10 which secures the inner portions of members 11 and 13, it will be noted that member 13 diverges relative to the center opening defined in part by weld 12 and is secured to converging member 15 by outer circumferential weld 14. Converging member 15 is secured to diverging member 17 by inner circumferential weld 16. In a similar manner outer weld 18 secures members 17 and 19, inner weld 20 secures members 19 and 21, outer weld 22 secures members 21 and 23 and inner weld 24 secures members 23 and 25. As illustrated, bellows 10 is in an unstressed state but in the region of the welds 12, 14, 16, 18, etc., the members are in at least nominal contact so that if the bellows 10 is compressed the members will come into closer contact over a larger region. As a result, dirt or the like located between the members in the regions of the welds, or weld beads, can lead to high stresses and failure of the bellows 10. It should be noted that dirt or the like can get between the elements from either the interior or from the exterior of bellows 10 and that the compression and expansion of the bellows 10 can serve to cause dirt to become trapped between the members thereby causing stress risers and failure of bellows 10.

Figure 3:
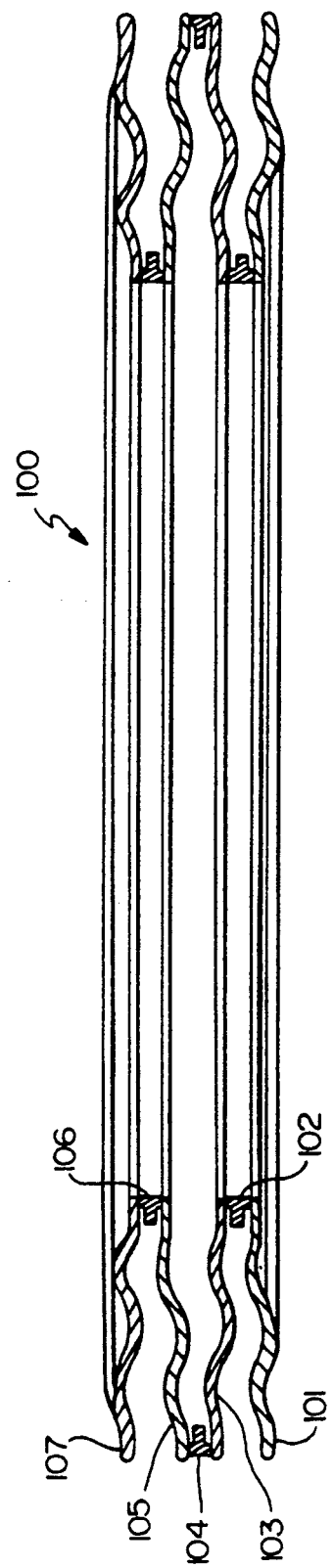
FIG. 3 is a enlarged sectional view of an assembled portion of the FIG. 2 device.
Figure 2:
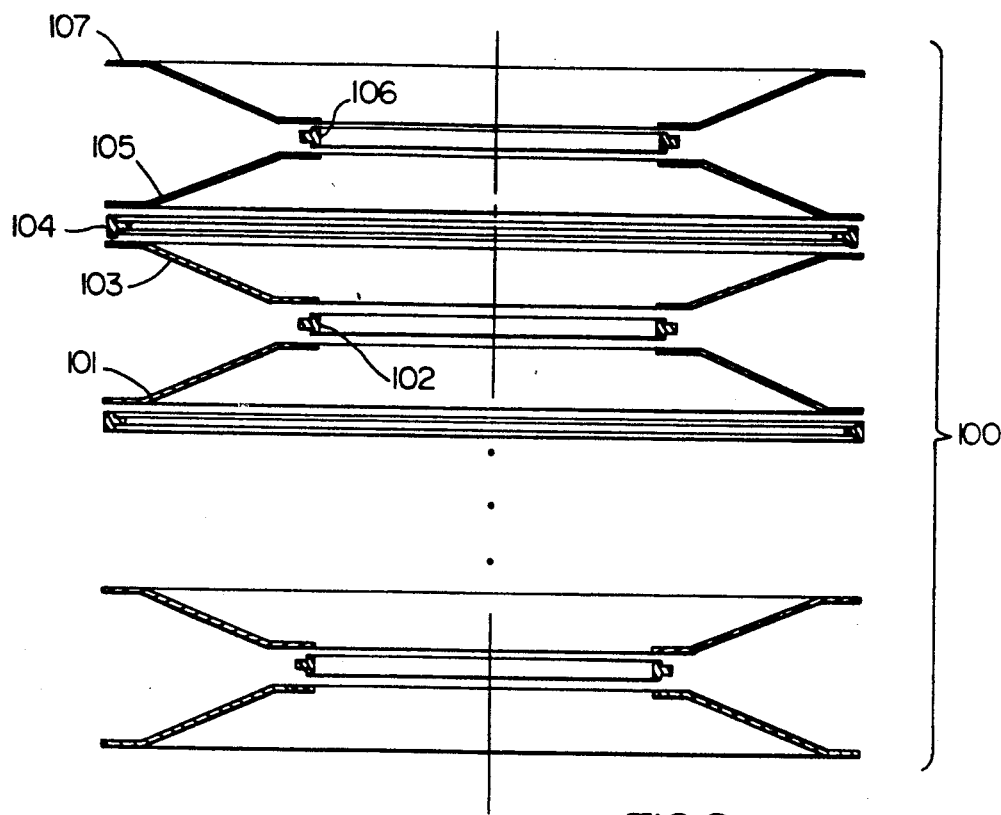
FIG. 2 is an exploded sectional view of a portion of a bellows made according to the teachings of the present invention.

Referring now to FIGS. 2 and 3, the numeral 100 generally designates a bellows with FIG. 3 showing a portion of the welded bellows made according to the teachings of the present invention. For simplicity, only members or diaphragms 101, 103, 105 and 107 are illustrated in FIG. 3. The inner portions of converging member 101 and the inner portion of diverging member 103 are welded on opposite sides of inner spacer ring 102 and thereby define a convolution. The outer portion of diverging member 103 and the outer portion of converging member 105 are welded on opposite sides of outer spacer ring 104. The inner portion of converging member 105 and the inner portion of diverging member 107 are welded on opposite sides of inner spacer ring 106.

Figure 4:
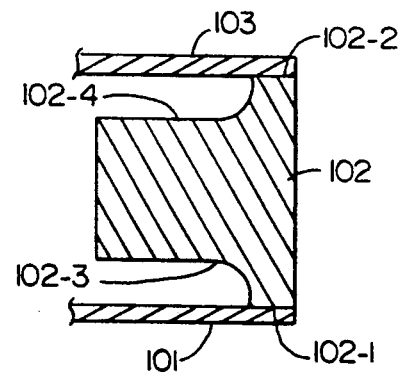
FIG. 4 is an enlarged view of a spacer ring of the embodiment of FIGS. 2 and 3 welded in place.

FIG. 4 is representative of any one of spacer rings 102, 104 and 106 of FIG. 3 and which would only differ by the number labeling of the parts and as to which side of the axis the view was taken. Spacer ring 102 has radially extending annular flat areas 102-1 and 102-2 to which members 101 and 103, respectively, are secured by full penetration welds. Annular flat areas 102-1 and 102-2 transition into recesses 102-3 and 102-4, respectively. Because spacer ring 102 is secured to members 101 and 103 over the full flat areas 102-1 and 102-2, respectively, there is no opening therebetween for the entry of dirt and the production of stress risers. The size of recesses 102-3 and 102-4 are such that they are much larger than the size of any dirt particles anticipated to be encountered. Accordingly, the recesses 102-3 and 102-4 would be the location of the greatest constriction between the members but would be too large to produce stress risers due to the relative size of the recesses and the dirt particles. Spacer rings 104 and 106 would function in a similar manner.

Figure 5:
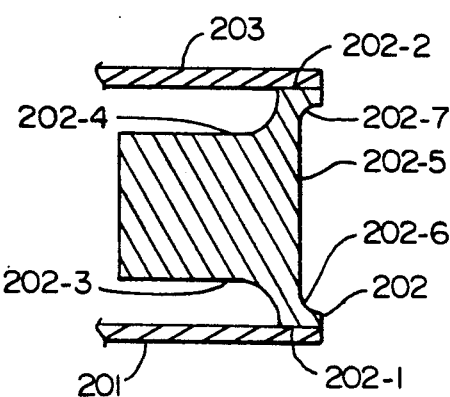
FIG. 5 is an enlarged view of a first modified embodiment.

In FIG. 5, spacer ring 202 differs from spacer ring 102 only in the addition of annular recess 202-5 with all other structure being numbered one hundred higher than in FIG. 4. The providing of recess 202-5 reduces the mass of spacer ring 202 which facilitates welding members 201 and 203 to spacer ring 202 as well as reducing the mass of the bellows. Additionally, recess 202-5 coacts with recesses 202-3 and 202-4 such that flat areas 202-1 and 202-2 defining the weld location are connected to the main portion of spacer ring 202 by webs 202-6 and 202-7, respectively. Webs 202-6 and 202-7 provide a more flexible connection of the welded portions thereby reducing stiffness of the bellows.

Figure 6:
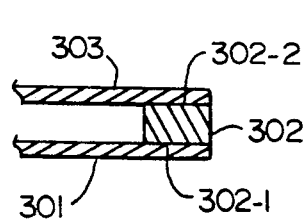
FIG. 6 is an enlarged view of a second modified embodiment.

In FIG. 6 spacer ring 302 is rectangular in cross section with member 301 being welded to flat annular area 302-1 and member 303 being welded to flat annular area 302-2. The thickness of spacer ring 302 maintains a separation of members 301 and 303 which is much greater than the size of any dirt particles expected to be encountered. The advantages of this specific design are that there is simplicity of manufacture of the spacer ring which could, for example, be punched or stamped from flat stock and in the need for only a single full penetration weld per inner/outer diameter instead of two welds.

The two end diaphragms of the bellows of each embodiment will, typically, have a weld terminal instead of a spacer ring on their outermost side. While the weld terminal may be a spacer ring, its actual structure will be a function of its intended attachment. For example, it may be a ring with drilled and tapped holes to permit its attachment or it may be welded to a massive member, as compared to a diaphragm.

Although preferred embodiments of the present invention have been illustrated and described, other changes will occur to those skilled in the art. It is therefore intended that the present invention is to be limited only by the scope of the appended claims.

What is claimed is:

1. A bellows comprising:
    a plurality of annular elements;
    each of said annular elements having a first and a second side, an inner diameter with a generally flat area associated therewith and an outer diameter with a generally flat area associated therewith;
    a plurality of inner annular spacer rings;
    a plurality of outer annular spacer rings;
    each of said plurality of inner annular spacer rings having first and second axially spaced, annular, radially extending generally flat areas corresponding to said generally flat areas associated with said inner diameter;
    each of said plurality of outer annular spacer rings having first and second axially spaced, annular radially extending generally flat areas corresponding to said generally flat areas associated with said outer diameter;
    said annular elements and said plurality of inner and outer annular spacer rings being assembled in a cylindrical stack such that said first sides of adjacent annular elements are facing and sealingly secured to a common one of said inner annular spacer rings and said second sides of adjacent annular elements are facing and sealingly secured to a common one of said outer annular spacer rings; and
    each of said inner and outer spacer rings having dirt collecting recesses adjacent said radially extending generally flat areas.

2. The bellows of claim 1 wherein said generally flat area associated with said inner diameter are axially spaced from said generally flat area associated with said outer diameter in said annular elements.

3. The bellows of claim 1 wherein said inner and outer spacer rings have an annular recess spaced from and coacting with said dirt collecting recesses to define web structure locating said radially extending generally flat areas.

* * * * *